United States Patent

[11] 3,530,800

[72] Inventor William M. Watkins
 West Covina, California
[21] Appl. No. 690,993
[22] Filed Dec. 15, 1967
[45] Patented Sept. 29, 1970
[73] Assignee WED Enterprises, Inc.
 Glendale, California
 a corporation of California

[54] SELF-ENERGIZING PROPULSION UNIT FOR DRIVING A VEHICLE
 1 Claim, 7 Drawing Figs.

[52] U.S. Cl. ................................................. 104/168
[51] Int. Cl. ............................................ B61b 13/12
[50] Field of Search .......................................... 104/168,
 165; 267/1FC

[56] References Cited
 UNITED STATES PATENTS
 1,388,508 8/1921 Brilhart ........................ 105/168X
 1,656,301 1/1928 Stevens ........................ 267/1
 3,249,065 5/1966 Adams, et al. ................. 104/168X Primary Examiner—Arthur L. La Point
Assistant Examiner—George H. Libman
Attorney—Fulwider, Patton, Rieber, Lee and Utecht ABSTRACT: A self-energizing propulsion unit for driving a vehicle, such vehicle being provided at its underside with a platen. The propulsion unit includes a drive wheel that frictionally engages the platen to drive the platen and hence the vehicle forwardly. The drive wheel is carried by a support for powered rotation about a horizontal axis essentially normal to the direction of movement of the vehicle. The drive wheel support has its rear end mounted for movement about a horizontal axis normal to the direction of travel of the vehicle. Spring means bias the front of the drive wheel support upwardly against the platen to effect initial frictional engagement of the drive wheel with the front of the platen. As the drive wheel begins to apply force to the platen the reaction load causes the drive wheel to tend to pivot upward thereby providing sufficient force to secure traction between the wheel and platen.

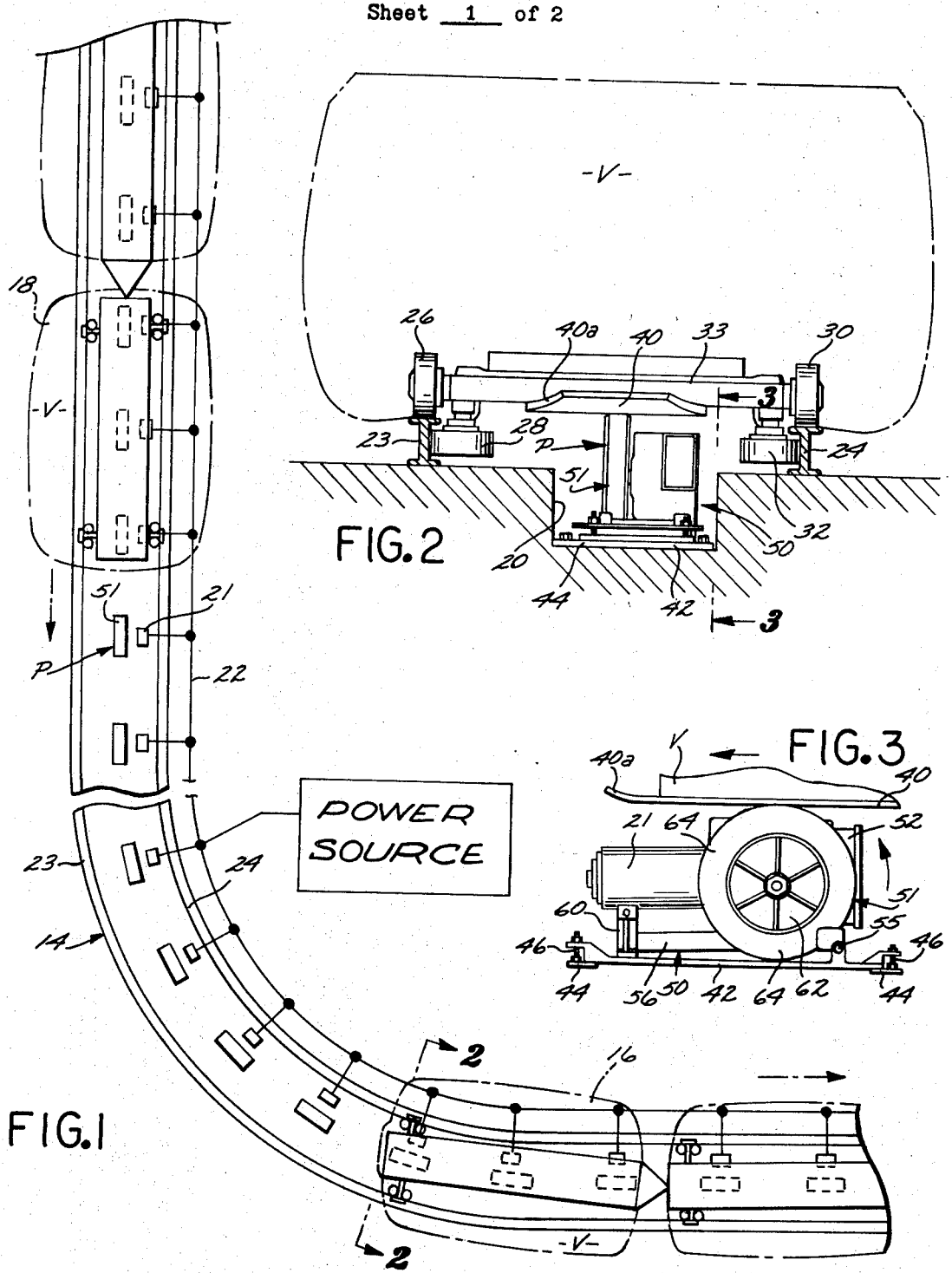

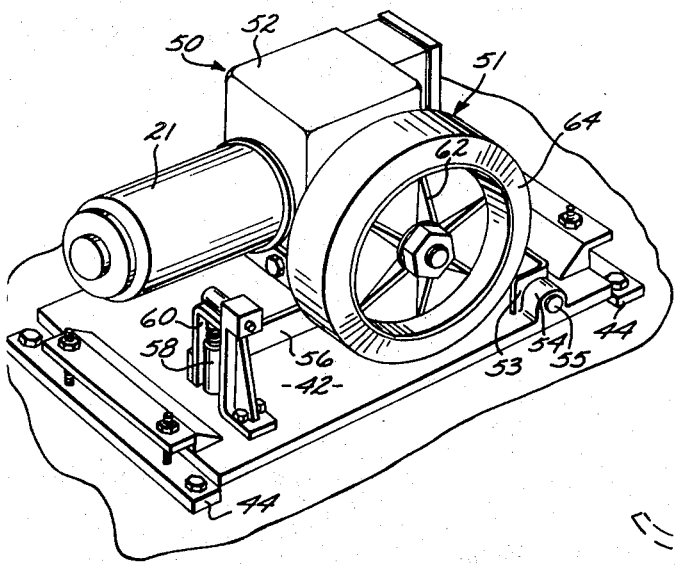
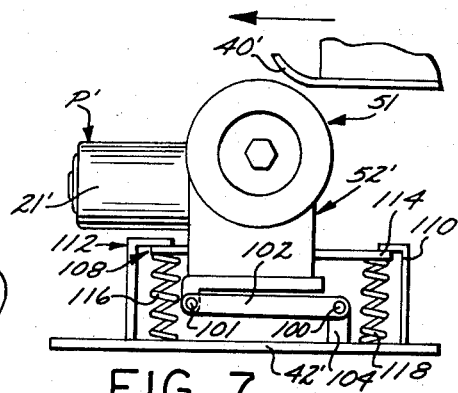
FIG. 4
FIG. 7
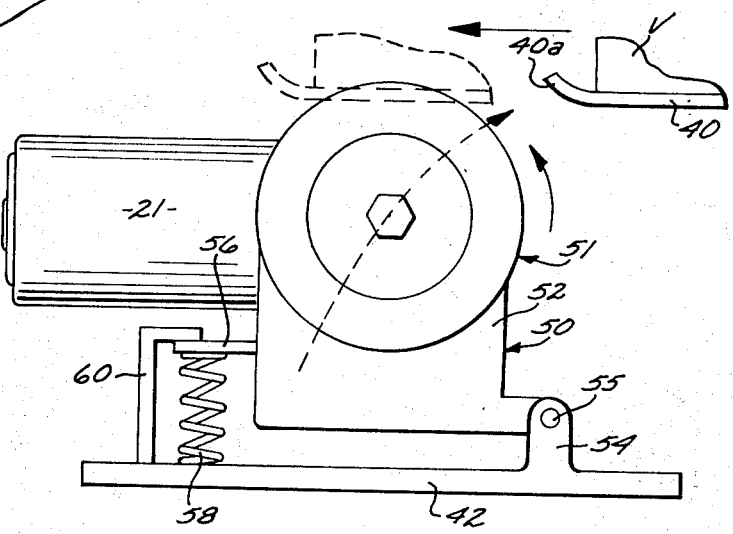
FIG. 5
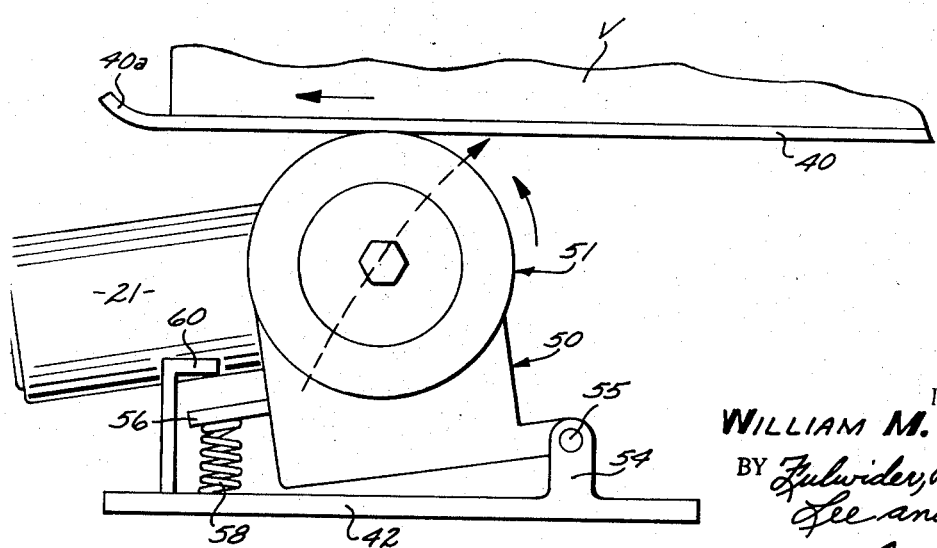
FIG. 6
INVENTOR.
WILLIAM M. WATKINS
ATTORNEYS 3,530,800

1

SELF-ENERGIZING PROPULSION UNIT FOR DRIVING A VEHICLE

BACKGROUND OF THE INVENTION

1. Field of the Invention

The present invention relates generally to passenger-carrying apparatus employing one or more passenger cars or trains of passenger cars movable along a track between one or more loading-unloading stations.

2. Description of Prior Art

In U.S. Pat. No. 3,249,065 issued May 3, 1966, there is disclosed a propulsion unit for driving a vehicle-mounted platen. Such propulsion unit, however, is not self-energizing and cannot provide the smooth transmission of the rotational force of the drive wheel into forward propulsion of the vehicle possible with the propulsion unit of the present invention.

SUMMARY OF THE INVENTION

It is a particular object of the present invention to provide a vehicle propulsion unit which is self-energizing responsive to the load it must propel. The propulsion unit includes a base which is supported below the track or roadway for such vehicles, with such base mounting a support for a vertically extending drive wheel. The drive wheel frictionally engages a platen secured to the underside of the vehicle. The drive wheel support has its rear end pivotally connected to the base for movement about a horizontal axis normal to the direction of movement of the platen. The drive wheel is powered about a horizontal axis parallel to the aforementioned horizontal axis. Spring means are interposed between the front end of the drive wheel support and the base to bias the drive wheel upwardly against the platen with a force sufficient to effect initial frictional engagement between the drive wheel and the front of the platen. As the load to be propelled is applied to the drive wheel by the platen the drive wheel and its support tends to pivot upwardly with the drive wheel applying a self-energizing force to the platen that is proportional to the magnitude of such load, to a degree which is determined by the position of the pivot axis of the support reaction to the point of contact between the wheel and platen.

DESCRIPTION OF DRAWINGS

FIG. 1 is a top plan view of a plurality of propulsion units embodying the present invention arranged along a track to propel one or more trains of vehicles;

FIG. 2 is a vertical sectional view taken in enlarged scale along line 2–2 of FIG. 1;

FIG. 3 is a broken vertical sectional view taken along line 3–3 of FIG. 2;

FIG. 4 is a perspective view showing a preferred form of self-energizing propulsion unit embodying the present invention;

FIGS. 5 and 6 are diagrammatic views showing the mode of operation of said propulsion unit; and FIG. 7 is a diagrammatic view showing a second form of the invention.

DESCRIPTION OF THE PREFERRED EMBODIMENT

Referring to the drawings and particularly FIGS. 1 and 2 thereof, there is shown a track or roadway, generally designated 14, along which a plurality of vehicles or trains 16 and 18 of like vehicles V are adapted to be moved in the direction indicated by the directional arrows. The vehicles V are propelled around the track 14 by a plurality of like propulsion units P embodying the present invention. The propulsion units P may conveniently be mounted in a trench 20 which extends coextensive with the track 14 as shown in FIG. 2. Each propulsion unit P includes an electric motor 21 connected to a common power source by power line 22.

With continued reference to FIG. 2, the track 14 may be defined by a pair of rails 23 and 24 which engage rollers 26, 28 and 30, 32, respectively, that are mounted on the chassis 33 of the vehicles V. The vehicles V may conveniently be self-steering. Each of the vehicles V mounts an elongated longitudinally extending platen 40 which may be made of any suitable material such as plywood or a sandwich arrangement of thin structural aluminum or the like secured by any suitable means to the underside of the chassis 33 of each vehicle. The front end of each platen 40 is curved upwardly as indicated at 40a.

Each of the propulsion units P includes a horizontal platelike base 42 which as indicated in FIG. 2 and FIG. 3 is secured within the trench 20 to fixed crosspieces 44 arranged at the bottom of the trench. Suitable adjustment means 46 may be interposed between the opposite ends of the base 42 and the crosspieces 44 to control the elevation of the front and rear ends of the base 42. Base 42 carries a drive wheel support, generally designated 50, for a vertically extending drive wheel 51. The drive wheel support 50 includes a gear box 52 which is driven by means of one of the aforementioned electric motors 21. The rear end of the gear box 52 is rigidly affixed to a transverse channel member 53. The channel member 53 is pivotally connected to a pair of ears 54 formed on base 42 by a horizontal pivot rod 55. A longitudinally-extending force transfer arm 56 has its rear end rigidly affixed to the intermediate portion of the channel 54. The front or free end of this force transfer arm 56 is engaged with a coil compression spring unit 58. An up stop 60 is secured upon base 42 to limit upward pivotal movement of the front end of force transfer arm 56. Each drive wheel 51 is of like construction and includes a rigid wheel 62 upon which is mounted a resilient tire 64. Each wheel 62 is keyed to a horizontal shaft that is driven by an electric motor 21 through gearbox 52 in a conventional manner.

In the operation of the aforedescribed apparatus, the electric motors 21 constantly rotate their respective drive wheels 51 in a counterclockwise direction, as viewed in FIGS. 3—6. Referring now to FIG. 5, as a vehicle V approaches a drive wheel 51 in a right-to-left direction, the platen 40 will have its bottom surface at an elevation shown in dotted outline. Thus, the platen's underside will be slightly lower than the upper periphery of the drive wheel. In practice a distance of approximately five-sixteenth inches between the platen's underside and the top surface of the drive wheel has proven satisfactory. At this time the coil compression spring unit 58 will maintain the drive wheel in its uppermost position of this FIG.

Referring now to FIG. 6 as the platen 40 engages the periphery of the drive wheel 51, the drive wheel support and its associated elements will pivot forwardly and downwardly about the axis of the pivot rod 55 connecting the rear of drive wheel support 50 to the base 42, as indicated by the directional arrows. Frictional engagement of the drive wheel tire 64 with the underside of platen 40 serves to cause the rotational movement of the drive wheel to generate a reaction force which causes the drive wheel to be forced upward about the pivot rod axis thereby developing the traction necessary to transmit forward lineal motion to the platen.

It should be particularly noted that the upward force applied by compression spring unit 58 to the front of the drive wheel support need only be of sufficient magnitude to support the weight of the drive wheel support and its associated elements and that the force necessary for traction is generated by the self-energizing feature of the mount. Accordingly, minimum bumping will take place upon initial engagement of the drive wheel 51 and the platen 40, with the curved front end 40a of the platen further minimizing any bumping. A smooth ride for the occupants of the vehicles is thereby possible. Such smooth ride is enhanced where the spacing between proximate drive wheels 51 is so chosen that each platen 40 is in continual engagement with at least two drive wheels.

The magnitude of the load applied against the platen by the drive wheel is dependent on the load required to move the vehicle. Hence, the propulsion units of the present invention are self-energizing and the amount of upward force applied by the drive wheels is not dependent upon the magnitude of the force applied by the spring means 58; as is the case with presently-known drives of this nature. The propulsion units of the present invention will afford a smooth ride even where the vehicle V must be moved up an incline.

Referring now to FIG. 7, there is shown a second form of propulsion unit P' embodying the present invention. This form of propulsion unit is adapted to be self-energizing both in applying forward motion to the vehicles or in braking such vehicles. In Unit P' includes a base 42' over which is disposed an electric motor 21' that powers a drive wheel 51' through a gear-box 52'. The gearbox 52', however, is connected to base 42' in a different manner than shown in FIGS. 1—6.

Thus, a pair of legs 102 (only one of which is visible in FIG. 7) have their rear or right-hand ends pivotally secured to upstanding ears 104 formed on base 42'. The front or left-hand ends of legs 102 are pivotally secured to a pair of legs 106 that depend from the left-hand underside of gearbox 52'. A horizontal force transfer arm 108 is formed on the front of gearbox 52' and a front coil compression spring unit 110 is interposed between the underside of arm 108 and base 42'. A front upstop 112 extends upwardly from base 42' to limit upward movement of arm 108. A rear force transfer arm 114 is formed on the rear of gearbox 52' and a rear coil compression spring unit is interposed between the underside of this arm 114 and base 42'. A rear upstop extends upwardly from base 42' to limit upward movement of arm 114.

In the operation of this form of the invention, the platen 40' of an approaching vehicle will depress the drive wheel 51'. At this time the supporting means for the drive wheel will be free to pivot forwardly and downwardly if the vehicle is moving slower than the peripheral velocity of the drive wheel, just as in the case of the unit P of FIGS. 1—6, or alternatively such support means will be free to pivot downwardly and rearwardly to thereby brake the vehicle if its speed exceeds the peripheral velocity of the drive wheel. In either event the propulsion unit P' will be self-energizing.

Various modifications may be made with respect to the foregoing detailed description without departing from the spirit of the present invention or the scope of the following claim.

I claim:

1. A self-energizing propulsion unit for driving a vehicle-mounted platen, comprising:

a base;

a drive wheel support having its rear portion pivotally connected to said base for pivotal movement about a rear horizontal axis normal to the direction of travel of said platen, said drive wheel support also having its front end pivotally connected to said base for pivotal movement about a front horizontal axis normal to the direction of travel of said platen through linkage means permitting both downward and forward and downward and rearward movement of said support;

a vertically extending drive wheel carried by said drive wheel support for powered rotation about a horizontal axis parallel with said first-mentioned axis;

spring means interposed between the front portion of said drive wheel support and said base to bias said drive wheel upwardly into engagement with the underside of said platen; and second spring means interposed between the rear portion of said support and said base to bias said drive wheel upwardly into engagement with the underside of said platen.